Dec. 16, 1952 N. FIENBERG ET AL 2,621,363
PLASTIC MOLDING MACHINE
Filed July 24, 1950 7 Sheets-Sheet 1

Fig. 1

Inventors
N. Fienberg
A. R. Calder
By Stuart Downing Diebold
Attys.

Dec. 16, 1952   N. FIENBERG ET AL   2,621,363
PLASTIC MOLDING MACHINE
Filed July 24, 1950                     7 Sheets-Sheet 2

Fig. 2.

Inventors
N. Fienberg
A. R. Calder
By Rosen & Downing
Attys.

Dec. 16, 1952    N. FIENBERG ET AL    2,621,363
PLASTIC MOLDING MACHINE
Filed July 24, 1950    7 Sheets-Sheet 3

Inventors
N. Fienberg
A. R. Calder
By Glascock Downing Seibold
Attys.

Fig. 7

Inventors
N. Fienberg
A. R. Calder
By Hancock Downing Seebold
Attys.

Fig. 8

Patented Dec. 16, 1952

2,621,363

UNITED STATES PATENT OFFICE 2,621,363

PLASTIC MOLDING MACHINE

Nathan Fienberg, Caulfield, Victoria, and Alan Reginald Calder, Newport, Victoria, Australia, assignors to A. C. I. Plastics Proprietary Limited, Melbourne, Victoria, Australia, a company Application July 24, 1950, Serial No. 175,631 In Australia July 25, 1949

11 Claims. (Cl. 18—20)

This invention relates to the moulding of plastic materials and one of its general objects is to provide an improved automatic machine for moulding articles from thermosetting or thermoplastic material.

One specific object is to provide a machine having improved means whereby the duration of the moulding operation may be readily and accurately regulated.

Another object of the invention is to provide means for venting air and gas from the moulds to permit of an increased rate of production and obviate or reduce distortion of the moulded articles.

A further object is to provide improved means for supplying measured quantities of moulding power to the moulds and thus reduce the percentage of flash or wastage.

Still another object is to provide a moulding machine adapted for performing finishing operations on the moulded articles such as by removing flash therefrom.

Yet another object is to provide a machine adapted to mould each article in successive stages.

Accordingly, the invention includes a moulding machine comprising a movable mould carrier adapted to support a plurality of alternative mould members, and to move same successively to a moulding station, means for supporting a further mould member, means operable after each actuation of the mould carrier to close together said further mould member and that alternative mould member which is located at the moulding station, regulatable timing means operable to control the period during which such mould members remain closed and means operable to actuate said mould carrier intermittently at a speed determined independently of said timing means.

The invention also includes a moulding machine comprising a carrier operable intermittently to move a plurality of alternative members of a final mould successively into and out of register with coacting final mould means, a preliminary mould comprising separable sections, and transfer means operable substantially in unison with said carrier to convey a semi-moulding from said preliminary mould to the final mould. The machine also preferably includes means operable to remove moulded articles from said alternative mould elements when the latter are disposed out of register with said coacting mould means.

The said transfer means for the semi-mouldings preferably comprises a reciprocable member operable in timed relation with said carrier.

The said moulding machine also preferably includes measuring and feeding means for moulding powder or the like and comprising a substantially horizontal table, a reciprocable feeder member arranged above and movable parallel to the surface of the table, a measuring compartment extending from the upper surface of said feeder member to the surface of said table, said measuring compartment being in register with a mould cavity when the feeder member is disposed at or near one end of its path of movement and means operable to direct moulding material into said measuring compartment when the feeder member is disposed at or near the other end of its path of movement.

Preferably the said feeder member is adjustable towards and from said table to vary the volume of said measuring compartment and adjustable means are provided for maintaining close contact between the lower surface of said feeder member and the upper surface of the table.

The aforesaid final mould preferably comprises a plurality of alternative intermediate members supported on said carrier such members being open at their opposite ends, an opposed pair of end mould members arranged when each intermediate member is disposed at the moulding station to coact therewith to form a mould cavity therebetween and means operable to separate said coacting mould members substantially simultaneously whereby the pressures on opposite sides of the moulded article are equalised.

One of said end mould members preferably comprises a reciprocable plug adapted to enter and engage the inner periphery of the operative intermediate mould member and shallow gas discharge grooves are preferably formed by and between the engaging surfaces of said plug and intermediate mould member.

The intermediate members of the mould are preferably so formed that the moulded articles are retained thereto when the mould is opened and the invention includes means operable when each such intermediate member is removed from the moulding station, to separate the moulded articles therefrom.

The invention also includes hydraulic mechanism as hereafter described for actuating the aforesaid machine and regulatable hydraulic timing means arranged to determine the duration of the moulding operation.

Another broad feature of the invention resides in the method of forming a moulded article comprising measuring a predetermined quantity of moulding material, transferring said moulding material to a preliminary mould and moulding same therein, transferring the semi-moulding so formed to a final mould and completing the moulding operation therein and finally transferring the moulding to a finishing position and removing flash therefrom.

Preferably the said measuring, preliminary moulding, final moulding and finishing operations are performed substantially simultaneously on or for the manufacture of successive moulded articles.

Reference is had to our copending applications Serial Nos. 175,632 and 175,633, both filed on July 24, 1950, and Patent No. 2,568,956 dated September 25, 1951.

For a more particular description of the preferred practical embodiment of the invention, reference will be made to the accompanying drawings, in which.

*Brief description of formation of mouldings*

Figure 1:
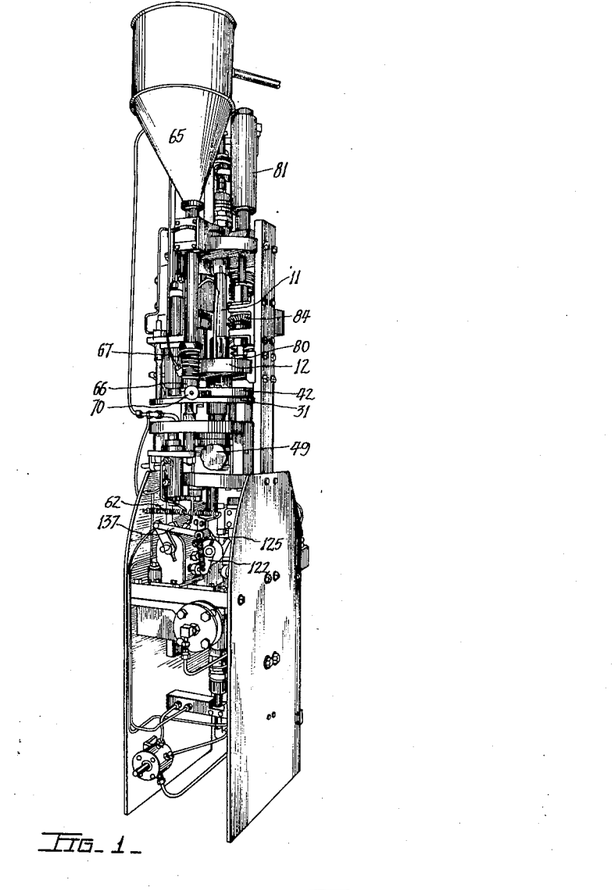
Figure 1 is a view in perspective of a moulding machine.
Figure 2:
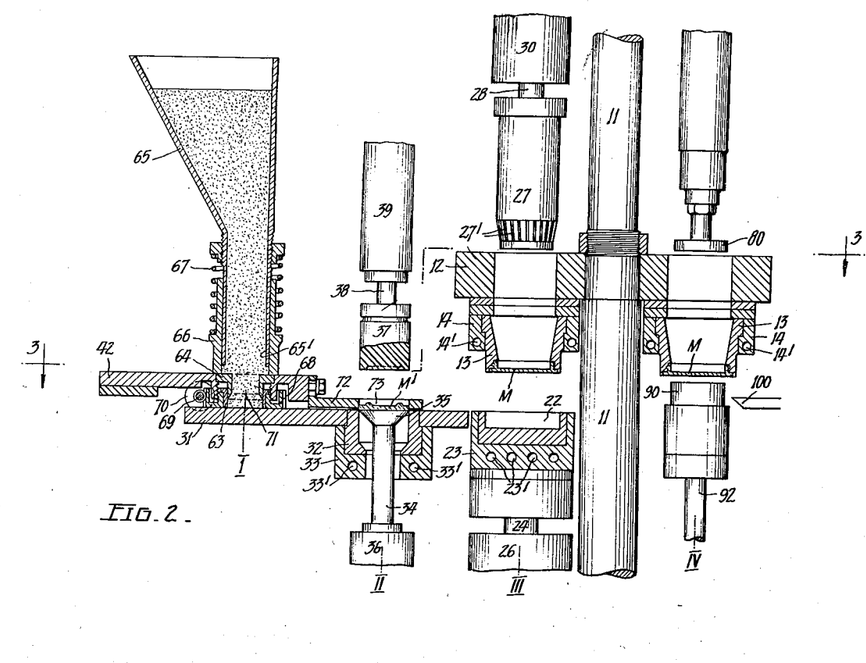
Figure 2 is a developed view in sectional elevation showing the several stages in the formation and finishing of a moulded article in the said machine.
Figure 3:
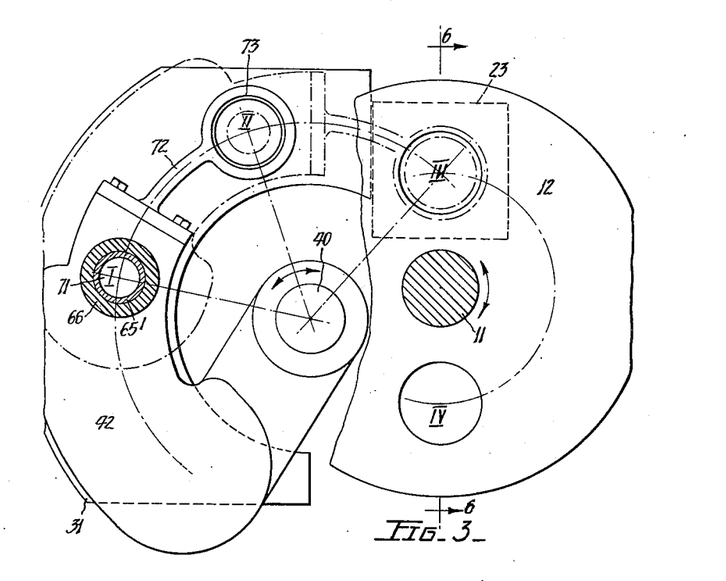
Figure 3 is a view in sectional plan taken on a plane corresponding to that indicated by the line 3—3 of Figure 2 but showing the operating stations in their correct relative positions.

The operations required to form and discharge each moulded article M are performed successively at the four stations designated I, II, III and IV in Figures 2 and 3, such stations being disposed adjacent to a common horizontal plane.

At station I, a charge of moulding powder is measured and is then transferred to the cavity of a preliminary mould located at station II, where it is subjected to a relatively low pressure and formed into a partly polymerised semi-moulding M' of appropriate shape. This semi-moulding is then transferred to the lower element of a main mould located at station III and is moulded therein to form the required article M, while finally the moulded article is transferred to station IV at which the flash is removed and/or other finishing operations are performed and the article is ejected from the machine.

While the article at station IV is being finished and ejected, the next succeeding article is being moulded at station III, a pre-shape or semi-moulding is being formed at station II, and a measured charge of moulding powder is awaiting transfer from station I. Also the described transfer operations are performed simultaneously, that is to say, as a moulded article is being transferred to station IV, a semi-moulding is transferred to the final mould at station III, and a measured volume of moulding powder is delivered to the preliminary mould at station II.

Thus the four operations involved in the formation of an article as above described are performed substantially simultaneously on or for the production of four successive articles and one completed article is delivered from station IV at each operation of the machine.

The rate of production of the moulded articles when same are formed of thermosetting material is determined primarily by the time required to complete the formation of the article and polymerise the moulding material in the final mould as the intervening transfer operations are performed relatively quickly. Also the time required for said moulding operation is reduced as compared with the usual moulding technique, firstly because the moulding material is supplied to such mould in the form of an already heated, partly shaped and partly polymerised semi-moulding M', secondly because the construction of the final mould provides as hereafter described for the ready escape of air and generated gases from the mould cavity. Accordingly, the production rate is, or may be, substantially higher than could otherwise be obtained from a single mould.

The machine is operated hydraulically and includes an adjustable hydraulic timing device by operation of which the duration of the said moulding operation may be regulated without affecting the speed at which the transfer operations are performed.

*General description of machine*

The main frame generally designated 10 is provided with bearings for a semi-rotary vertical spindle 11 having a mould carrying disc 12 secured thereto somewhat below its upper end.

This disc is formed with a diametrically opposed pair of through holes and a tubular member 13 consituting an intermediate element of a three-part main mould, is arranged coaxially below each such hole and is secured to the disc by a corresponding bolster 14.

Figure 8:
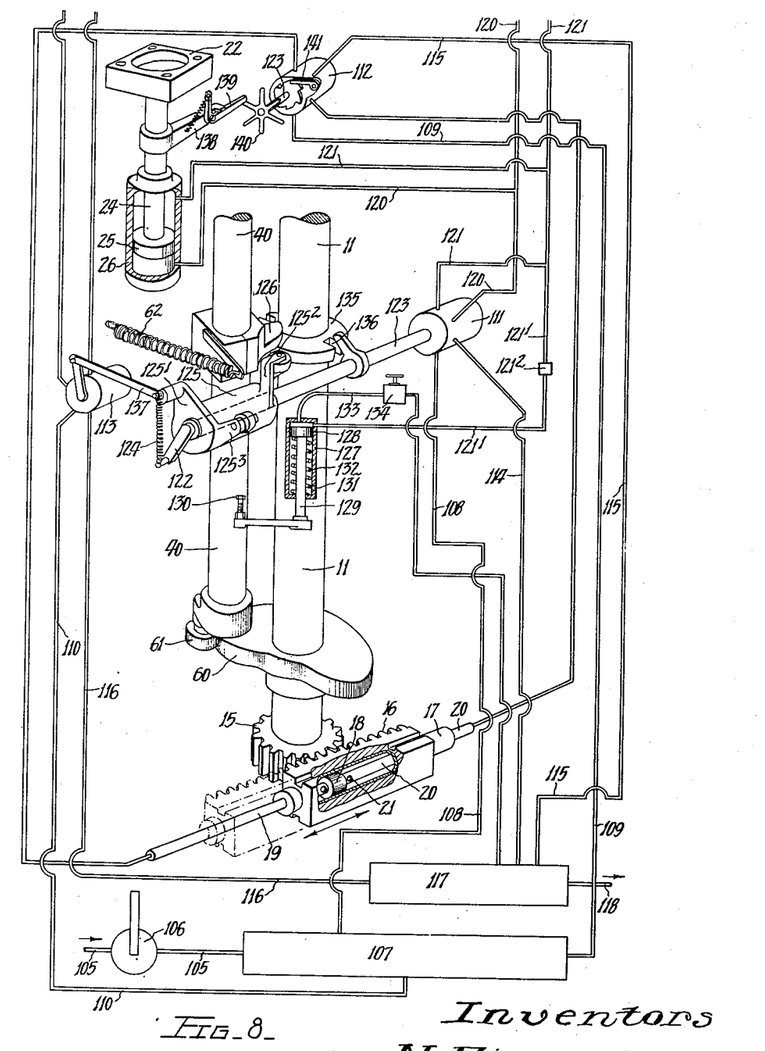
Figure 8 is a perspective view similar to Figure 7 and shows a lower portion of the machine.

The spindle 11 is arranged to be moved alternately forwardly and rearwardly through an angle of 180° so that the tubular mould members 13, are alternately located at stations III and IV abovementioned, for which purpose a pinion 15 secured to a lower portion of the spindle is in constant mesh with a reciprocable rack 16 slidably supported in suitable guides fixed to the frame of the machine (Fig. 8).

The rack 16 is secured to a cylinder 17 within which is arranged a plunger 18 secured to the main frame by opposed hollow plunger rods 19 and 20 which extend slidably through glands at the ends of the cylinder.

Pressure fluid is supplied alternately to the opposite ends of the cylinder through the hollow plunger rods for which purpose the axial passages therein communicate by radial holes 21 with the interior of the respective ends of the cylinder.

The sliding movements of the rack and cylinder are limited by adjustable end stops, so that the carrier 12 may be caused to stop with the mould members 13 located accurately at stations III and IV.

The lower member 22 of the final mould is arranged at station III below the level of the carrier disc 12 so that same is disposed in coaxial alignment with the intermediate mould members 13 as same are successively positioned at station III.

This lower mould member 22 is detachably secured by a bolster 23 to the upper end of a vertical plunger rod 24 fitted at its lower end with a plunger 25, slidably arranged within a fixed vertical cylinder 26.

Figure 6:
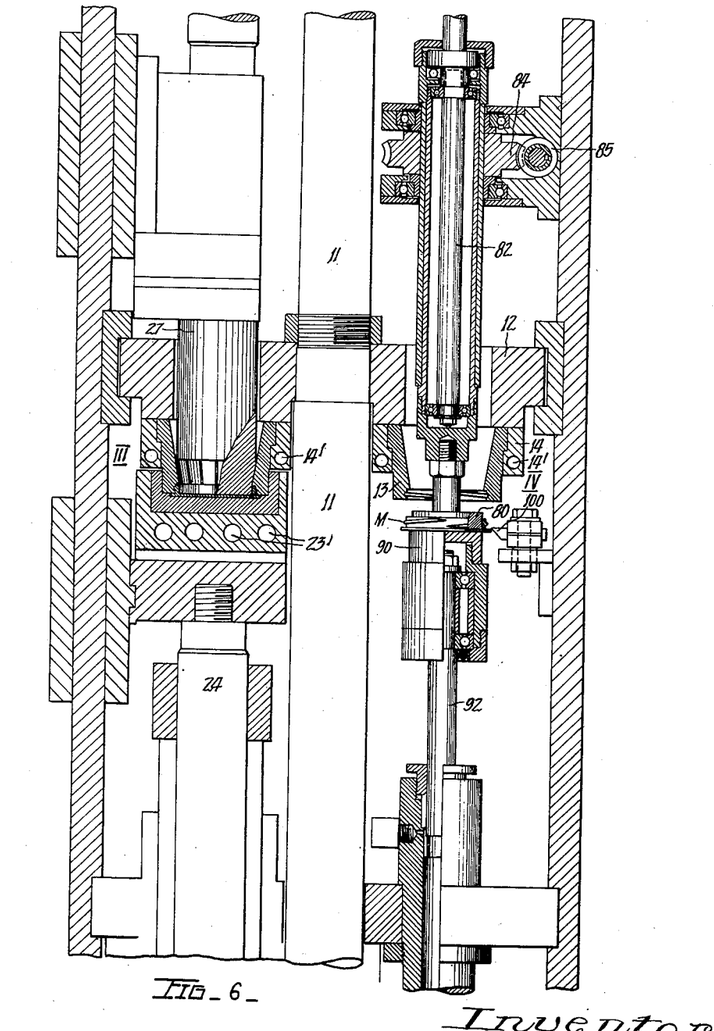
Figure 6 is a view in sectional elevation taken on the line 6—6 of Figure 3.

The said lower mould member is normally retracted but when pressure fluid is supplied to the lower end of the cylinder 26, such mould is raised into interfitting engagement with the lower end of the coacting intermediate mould member 13, as shown at the left of Figure 6.

A vertical pressing plunger 27 which forms the upper member of the final mould, is arranged coaxially above the lower mould member 22 at station III with its lower end normally disposed above the level of the upper surface of the carrier disc 11, such pressing plunger being secured to the lower end of a plunger rod 28 fitted with a plunger 29 which operates in a fixed vertical cylinder 30.

When the lower member 22 of the final mould occupies its normal retracted position, its upper surface is flush with, and forms a continuation of, the upper surface of a fixed horizontal table 31 of arcuate shape in plan and the latter carries a replaceable preliminary mould 32 located at station II, with its upper surface flush with the upper surface of the table as best shown in Figure 3, such mould 32 being enclosed within a bolster 33.

A plunger rod 34 projects vertically upwards through the bottom of the preliminary mould 32 and is fitted at its upper end with an ejector head 35, which fits neatly within the mould cavity and the upper surface of which forms the bottom of the mould cavity when said head is retracted.

This plunger rod 34 is provided at its lower end with a plunger which operates in a further double-acting hydraulic cylinder 36 suitably secured to the frame of the machine.

A pressing plug 37 which consitutes the male element of the preliminary mould is arranged vertically above the mould 32 and is secured to the lower end of a plunger rod 38 fitted at its upper end with a plunger slidably arranged within a corresponding double-acting hydraulic cylinder 39.

The preliminary and final moulds are heated in any convenient manner, for which purpose when same are required to be heated by steam, the bolsters 14, 23 and 33 therefor are formed with steam passages 14', 23' and 33' respectively.

*Powder feed mechanism*

Figure 5:
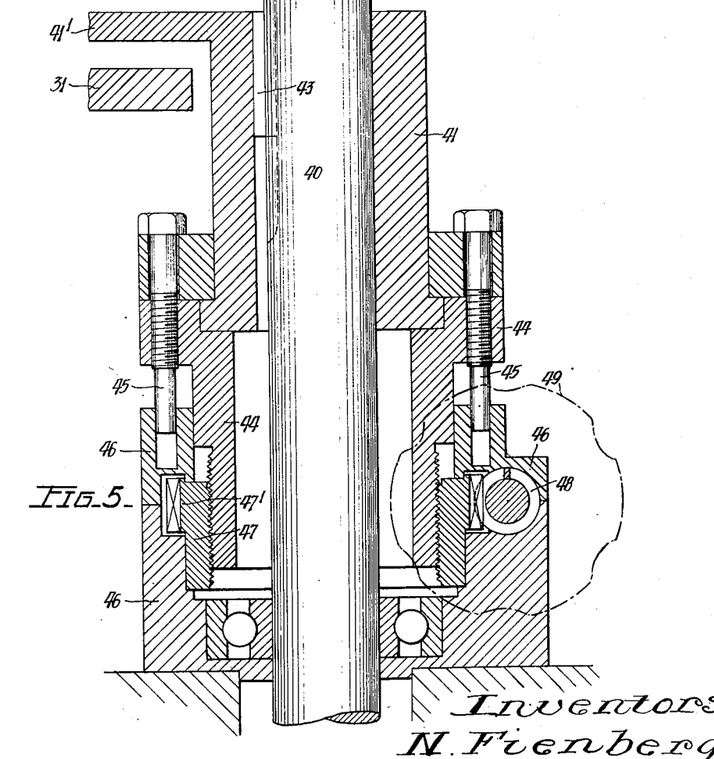
Figure 5 is a view in sectional elevation of raising and lowering means for the feed mechanism.
Figure 7:
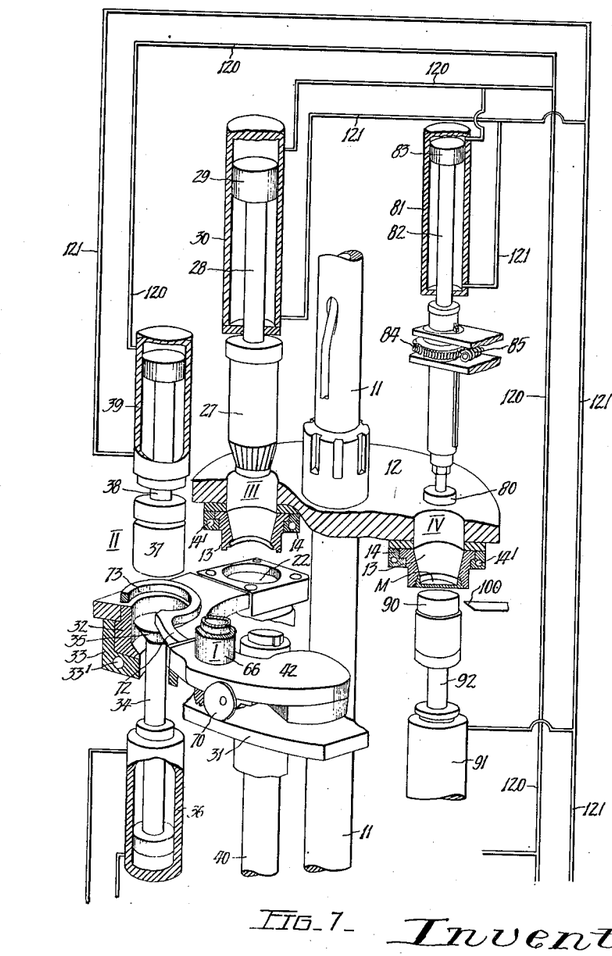
Figure 7 is a perspective view of the upper portion of certain operative portions of the machine and is partly schematic in character.

An oscillatable feed operating spindle 40 arranged vertically on the main frame adjacent to the main spindle 11 is fitted with a vertically adjustable sleeve 41 incorporating a radial arm 41' to the outer end of which is secured an arcuate feed plate 42 disposed above and adjacent to the surface of the fixed table 31 (Figs. 2, 5 and 7).

In order that the feed plate 42 may be raised and lowered relatively to the table 31, the sleeve member 41 is slidably mounted on the spindle 40, but is prevented by a key 43 from moving angularly thereon. The member 41 is provided at its lower end with an outwardly extending flange which is angularly movable in a vertically adjustable holder 44 but which is constrained to move axially therewith.

This holder 44 which is restrained against angular movements by guide pins 45 which project into holes in a fixed member 46 is screw-threaded externally at its lower end and is engaged by a nut 47 formed externally with worm teeth 47'

This nut 47 is free to rotate but is restrained against axial movements and the teeth thereon are in constant mesh with a worm 48 which is rotatable by a knob 49.

Thus by operating the knob 49 the feed plate 42 may be raised or lowered while the machine is either stationary or in motion.

The feed operating spindle 40 and feed plate 42 which moves in unison therewith, are actuated by a cam 60 on a lower portion of the main spindle 11, such cam being engaged by a follower roller 61 on a cranked arm at the lower end of the spindle 40 (Figure 8). The follower is maintained in engagement with the cam by a tension spring 62 anchored to the main frame 10 and the cam has a diametrically opposed pair of lobes, whereby the feed plate is caused to undergo a forward and then a return movement during each forward or return movement of the main spindle 11.

Figure 4:
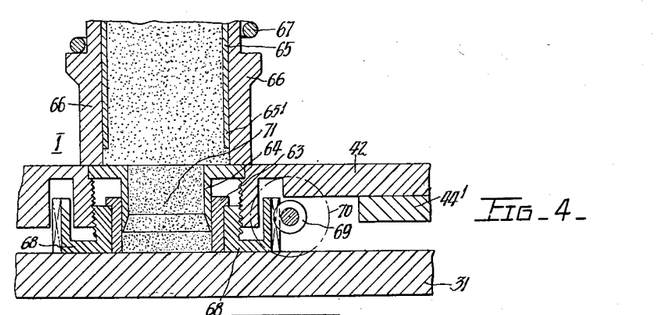
Figure 4 is a view to a larger scale of a portion of the feed mechanism shown in Figure 2.

A vertically disposed through hole is formed in the free end portion of the arcuate feed plate 42 to receive a replaceable bush 64 and when said feed plate is disposed in its normal retracted position, this bush is disposed coaxially below the delivery spot 65', of a powder hopper 65 and a measuring compartment 71 formed partly thereby contains a measured volume of moulding powder, while when said feed plate is disposed at the limits of its forward movement, it is disposed immediately above and in register with the cavity of the preliminary mould 32, whereby the measured charge of powder is supplied to that mould. (Figures 2 and 4.)

The lower end of the delivery spout 65' of the powder hopper is disposed clear of the upper surface of the feed plate but the escape of powder therebetween is prevented by a slidable sealing sleeve 66 which is maintained by a compression spring 67 in sliding contact with the feed plate.

The lower end of said powder measuring bush 64 on the feed plate is fitted with a vertically adjustable adapting sleeve 63 the lower surface of which is maintained in substantial sliding contact with the surface of the table 31.

For this purpose the sleeve 63 is supported in a rotatable carrier 68 which is screw-threaded at the outer periphery of an inner portion thereof to engage a corresponding internally screw-threaded socket in the undersurface of the feed plate, while the outer periphery of the outer portion of the carrier is formed with worm teeth and is engaged by a worm 69 fitted with an operating knob 70 and rotatively mounted on the feed plate. Thus by operating the knob 70 the adapting sleeve may be raised or lowered as required.

Accordingly the bush 64 and adapting sleeve 63 together form a powder measuring compartment 71, the volume of which may be adjusted by raising or lowering the feed plate 42 relatively to the fixed plate 31, by operating the adjusting knob while the position of the adapting sleeve 63 is consequentially adjusted by operation of the knob 70 so that its lower surface is maintained in sliding contact with the table 31 to prevent the escape of powder therebetween.

If desired, the adapting sleeve instead of being arranged to be raised and lowered as above described may be maintained in contact with the table 31 by a comparison spring (not shown).

The forward end of the feed plate 42 is fitted with a transfer arm 72 formed at its free end with a hole 73 somewhat greater in diameter than the cavity of the preliminary mould 32, such hole being in register with the said mould cavity when the feed blade occupies its normal retracted position as shown in Figures 2 and 7. When, however, the feed plate is moved forwardly so that the measuring compartment 71 therein is advanced into register with the preliminary mould, the aforesaid hole 73 in the transfer arm is simultaneously moved into register with the cavity in the lower member 22 of the main mould, such mould member being at this time retracted so that its upper surface is flush with the surface of the fixed table 31 of the machine. Immediately before the commencement of each advancing movement of the feed plate and transfer arm thereon, the ejector 35 of the preliminary mould is raised so that the semi-moulding M', formed therein during the preceding moulding operation, is located within the hole 73 in the transfer arm. Thus during each forward movement of the feed plate a semi-moulding M' is transferred from the preliminary mould to the main or final mould, while simultaneously a measured charge of moulding powder is delivered to the cavity of the preliminary mould, after which the feed plate and transfer arm are returned to their normal retracted positions.

*Construction of final mould*

As previously explained, the final mould comprises three coacting elements viz. the lower female mould member 22, the intermediate or ring mould 13 and the upper member or plunger 27. As shown in Figures 2, 6 and 7, this plunger is tapered immediately above its lower end to seat in the correspondingly tapered inner periphery of the ring mould 13 and such tapered portion of the plug is formed with a plurality of very shallow longitudinally extending grooves 27' which permit the escape of gas from the closed mould but which are so small in cross sectional area that the plastic material cannot penetrate far thereinto before it is polymerised. Thus the said grooves relieve the pressure of gas within the container during the moulding operation.

In order to close the mould, the plunger 27 is moved downwards into contact with the inner periphery of the ring mould 13 while substantially simultaneously the lower mould member 22 is raised to enclose the lower end of the ring mould 13, the respective rates of movement of the upper and lower members being regulated, so that the plunger seats in the ring mould to form the mould element of the mould before the lower mould member is raised to its full extent. See Figure 6. The moulded article M shown by way of example in the said figure is a shallow cylindrical container, the wall of which is screw-threaded externally, and it will be noted that the inner periphery of the lower end portion of the ring mould defines the screw-threaded external peripheral surfaces of the mould cavity, while the lower end of the plunger serves to mould the inner periphery, and the inner surface of the base, of the container.

At the conclusion of the moulding operation the plunger 27 and the lower mould element 22 are simultaneously retracted to the respective positions shown in Figure 2 of the drawings, so that the gases are simultaneously vented from both sides of the bottom of the moulded article M, thereby obviating distortion of the base of such article during the opening of the mould.

When a similar article having a thin, flat and relatively large diameter base, is moulded in the usual two-part mould and the mould is opened too quickly, the pressure of the gases trapped between the plug and the article which remains attached thereto, tends to bulge the bottom of the moulded article. In order to limit such distortion it is usual to cool the mould and delay the opening thereof until the gases and the moulded articles are partly cooled, but such delay obviously increases the time required to form such article.

When, however, as in the construction described and illustrated herein, the male portion of the mould comprises a ring mould and a retractible degassing plunger, this disadvantage is obviated or minimised and the rate of production may be increased.

After the degassing plunger 27 and the lower mould member 22 have been retracted from the ring mould 13, the main spindle 11 is turned through an angle of 180° so that the moulded article M is carried by the operative ring mould to the final station IV, while the other ring mould is simultaneously moved to the moulding position at station III.

*Take-out and finishing mechanism*

A mandrel 80 is arranged vertically above the ring mould 13 at station IV, such mandrel being rotatively mounted on a plunger rod 82, but constrained to move axially therewith. The plunger rod is secured to a plunger 83 which operates in a double-acting hydraulic cylinder 81 whereby the mandrel may be raised and lowered as required.

This mandrel extends slidably through a worm wheel 84 but is constrained to rotate in unison therewith by means of a key and the worm wheel is in constant mesh with a worm 85. This worm is rotated either continuously or intermittently by any suitable means (not shown), such rotation being in the direction required to unscrew the moulding M from the tubular mould member 13.

A further vertical mandrel 90 arranged below and in alignment with the ring mould at station IV is arranged to be raised and lowered by a further hydraulic cylinder 91 of smaller diameter than the cylinder 81, such mandrel being mounted for free rotation on the plunger rod 92.

The upper mandrel 80 is moved downwards in unison with the degassing plunger 27, whereby same moves downwards through the ring mould 13 and is simultaneously rotated while simultaneously the lower mandrel 90 is moved upwards to engage the lower surface of the moulded article M.

Thus when the upper rotating mandrel 80 engages the said article, the latter is clamped between the mandrels and is initially unscrewed from the ring mould 13 and then continues its downward movement as the lower mandrel being supported by a cylinder 91 of smaller diameter than the upper cylinder 81, is forced downwards in opposition to the pressure of fluid in said cylinder 91.

As the moulded article M continues its downward movement the periphery thereof is engaged by an edging tool 100 which is arranged to remove the flash or fin therefrom. Accordingly, when the upper mandrel 80 is retracted upwardly through the ring mould 13 and finished article remains on the lower mandrel 90 from which it is delivered into a chute and thus discharged from the machine. If desired, the machine may be adapted to perform other finishing operations also at station IV.

*Hydraulic system*

Referring now to Figures 7 and 8, oil from a suitable source of pressure is supplied by a pipe 105 to a main manually operable valve 106 which when opened directs same into an inlet distribution manifold 107 from which branch pipes 108, 109, and 110 extend to control valves 111, 112, and 113 respectively.

Similarly exhaust pipes 114, 115 and 116 extend from the said control valves to an exhaust manifold 117 provided with a discharge pipe 118 by which oil is returned to a reservoir (not shown).

The valve 111 controls the supply of oil to and its discharge from the cylinders 30 and 26 respectively for actuating the upper and lower members 21 and 22 respectively of the main mould, the cylinder 39 for the plunger 37 of the preliminary mould and the upper and lower cylinders 81 and 91 respectively arranged at the finishing and take-out station IV, the connections being such that the plungers of all of these cylinders are projected and retracted in unison.

Thus this valve 111 is connected by a pipe 120 provided with the necessary branches, also designated 120, to the upper ends of the upper cylinders 30, 39 and 81 and to the lower ends of the cylinders 26 and 91.

Similarly a branched pipe 121 connects the opposite ends of the last mentioned cylinder, to the valve 111.

Figure 9:
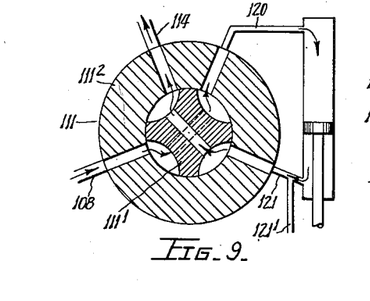
Figure 9 is a cross sectional view of a fluid control valve.
Figure 10:
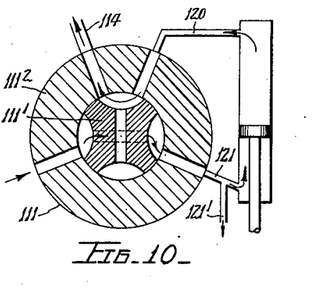
Figure 10 is a view similar to Figure 9 and shows another position of the valve.

This valve 111 and likewise valve 113 may be of any suitable type and are conveniently semi-rotary valves as shown in Figures 9 and 10.

The illustrated valve 111 comprises an angularly movable valve member 111' arranged within a casing 111² and is angularly movable therein with a snap-action between two extreme positions in one of which, See Fig. 9, the pipe 120 is connected to the supply pipe 108 and the pipe 121 is connected to the exhaust pipe 114 so that the plungers of the cylinders 26, 30, 39, 81 and 91 are projected. In the other extreme position of the valve member, see Fig. 10, the aforesaid connections are reversed so that the plungers of said cylinders are retracted.

The valve member 111' is actuated by a toggle mechanism which is illustrated in Figure 8 and which comprises a radial arm 122 secured to the forward end of the spindle 123 of the valve and having its free end connected by a spring 124 to an arm 125' on a sleeve 125 which is angularly movable on the spindle 123.

Thus by moving the arm 125', from either side of its dead center position with the arm 122, to the opposite side thereof, the valve member 111' is moved with a snap action to its other extreme position, such extreme positions being determined by suitably arranged stops.

The sleeve 125 carrying the arm 125' is moved in one direction by engagement of a cam 126 on the feed operating spindle 40, with a roller on the end of a second arm 125² on the said sleeve whereby as the feed plate 42 closely approaches the forward end of its stroke, the valve 111 is actuated to cause the plungers of the associated cylinders to be projected.

The said sleeve 125 is moved in the opposite direction by the plunger of a hydraulic timing device which coacts with a third arm 125³ on the sleeve.

This timing device comprises a cylinder 127 provided with a plunger 128 to which is attached a plunger rod 129 provided at its lower end with a laterally extending arm to which an adjustable stop 130 is fitted, such stop being arranged vertically below the free end of the arm 125³ so that the latter is displaced to cause the valve member 111' to be actuated, when the plunger of the timing cylinder is raised to the requisite position.

The lower end of the timing cylinder 127 is open to the atmosphere at 131 and the plunger therein is continuously urged upwardly by a spring 132.

The upper end of the timing cylinder is connected by a pipe 121' incorporating a non-return valve 121², to the pipe 121 from the main cylinder valve 111, so that before the commencement of each moulding operation, the plunger of the timing cylinder is fully projected as will be evident from Figures 8 and 10. When, however, the valve 111 is moved to the position shown in Figure 9, to cause the moulds to close, the supply of oil to the timing cylinder is cut off. The upper end of the timing cylinder 127 is also connected to the exhaust manifold by a pipe 133 incorporating an adjustable regulating valve 134, so that when the supply of oil to the cylinder is cut off by the valve 111, the plunger is urged upwardly by the spring 132 at a speed determined by the setting of the valve 134 until the stop 130 operates the toggle actuating means for the valve 111 as already described.

Thus the timing device enables the duration of the moulding operation to be regulated without affecting the speed at which the intervening transfer operations is effected.

In order to ensure that the main cylinder valve 111 may be operated only when the main spindle 11 is stationary with the tubular or ring moulds 13 thereon disposed in coaxial alignment with the coacting vertically movable members at stations III and IV an interlocking mechanism is provided. This mechanism comprises a disc 135 on the spindle 11, such disc being provided in its periphery with a diametrically opposed pair of radial clearance slots for a radial arm 136 secured to the spindle 123 of the valve 111. At each actuation of this valve, the free end of the arm 136 passes upwardly or downwardly through one or other of the said slots in the disc 135 so that the valve cannot be actuated unless the spindle 11 occupies either one of its two alternative positions.

As previously explained, the ejector 35 of the preliminary mould 32 is raised immediately following the pressing operation in preparation for the transfer of the semi-moulding M' and same is again lowered during such transfer operation to receive the next charge of moulding powder which is transferred at the same time. For this reason the supply of pressure oil to the operating cylinder 36 for the ejector is controlled by a separate semi-rotary ejector control valve 113 which is coupled by a link 137 to the arm 125' of, and is thus actuated by, the toggle operating member of the main cylinder valve 111 as shown in Figure 8.

The reciprocable cylinder 17 carrying the rack 16 for operating the main vertical spindle 11 is supplied with oil under pressure by means of the control valve 112 which is operated as the lower element 22 of the final mould completes its descending or retracting movement. For this purpose the plunger rod 24 which carries said mould member 22 is provided with a laterally projecting arm 138 which pivotally supports a spring-loaded trip arm 139 arranged to engage the arms of a star wheel 140 on the spindle of the rack control valve 112. Thus the main spindle 11 may be operated only when the lower member of the final mould is retracted and if desired, additional valves may be arranged to ensure that said spindle may be operated only when all of the reciprocable mould elements are retracted.

The valve 112 rotates in one direction only and is prevented by a pawl and ratchet 141 from turning in the opposite direction for which reason the trip arm 139 is arranged to swing downwardly to clear the star wheel when the mould member 22 is moving upwards.

Thus as each ring mould 13 arrives at the final moulding position at station III, the main cylinder valve 111 is operated to effect the closure of both the preliminary mould and the final mould. Simultaneously the plunger 128 of the timing cylinder 127 commences to move upwardly at a rate determined by the setting of the timing regulating valve 134 and when the predetermined moulding period has elapsed, the associated toggle mechanism is actuated to again operate the main cylinder valve 111 whereby the preliminary and main moulds are opened. As the lower member 22 of the main mould completes its retracting movement, it operates the control valve 112 for the rack bar cylinder 16 so that the rack 16 is displaced to turn the main spindle 11 through angle of 180° after which the cycle of operation is repeated.

It will thus be understood that the interval of time between the end of one moulding operation and the commencement of the next moulding operation is quite short and may be of the minimum duration required to effect the described transfer operations.

Preferably, a plurality of machines as herein described and illustrated are arranged side by side to operate in unison and same are preferably provided with a common take-out conveyor for the moulded articles.

It will be evident that if desired the mould carrier disc 12 may rotate intermittently in one direction to move the mould members 13 successively to the moulding station and that if desired, said disc may be provided with more than two moulds 13. In the latter case the machine may have a plurality of spaced moulding stations and intervening take-out stations, each of said moulding stations being associated with charge feeding means preferably as hereinbefore described.

We claim:

1. A plastic moulding machine comprising a movable mould carrier, a plurality of alternative ring moulds on said carrier, means operable to actuate said mould carrier intermittently whereby said alternative ring moulds are successively moved to and arrested at a final moulding station, a vertically movable lower member of the final mould arranged at said moulding station to coact successively with said alternative mould members, a vertically movable upper plunger at the final moulding station, said plunger being adapted to enter and seat in the successive ring molds, means operable to impart vertical movements to said plunger and lower mould member in timed relation with the carrier whereby after each actuation of the latter, said plunger and lower mould member are projected substantially simultaneously into coacting engagement with that alternative ring mould which is located at the moulding station and are then retracted therefrom, a preliminary mould spaced from the final moulding station and comprising a fixed lower female mould member and a coacting vertically movable plunger, the upper surface of said lower member of the preliminary mould being disposed substantially in the same horizontal plane as the upper surface of said lower member of the final mould when the latter is retracted, a fixed table having its upper surface substantially flush with the upper surface of said lower member of the preliminary mould and extending therefrom to the final mould, means operable after each moulding operation to eject the moulding from the lower member of the preliminary mould and means operable during each operation of the carrier to transfer the ejected preliminary moulding from the preliminary mould to the final mould by sliding same across the said table.

2. A plastic moulding machine according to claim 1 comprising a reciprocable feed blade arranged horizontally above the table, means operable during each movement of the carrier to move said feed blade horizontally forwardly and then rearwardly, a measuring compartment extending completely through the feed blade and having its lower end normally closed by the surface of the table and a powder delivery passage communicating with the upper end of said measuring compartment when the feed blade occupies its normal retracted position, said measuring compartment being disposed above and in register with said lower member of the preliminary mould when the feed blade is moved forwardly to its full extent.

3. A plastic moulding machine comprising a carrier supporting a plurality of spaced alternative members of a final mould, means operable to actuate said carrier intermittently to move said mould members successively to and arrest same at a final moulding station, a vertically movable lower mould member located at said moulding station to coact with the successive alternative mould members at such station, a preliminary mould spaced from the final moulding station and comprising a fixed lower member and a reciprocable vertical plunger arranged thereabove, reciprocable transfer means operable to transfer individual preliminary mouldings from the preliminary mould to said lower member of the final mould, means operable to actuate said carrier intermittently, means operable after each movement of the carrier to close and then reopen the preliminary and final moulds substantially simultaneously and means operable during each actuation of the carrier to impart a forward and a return movement to said transfer means whereby during such forward movement a preliminary moulding is transferred from the preliminary mould to the lower member of the final mould.

4. A plastic moulding machine according to claim 3 wherein each of said alternative mould members comprises a ring mould and the axis thereof is disposed vertically when same is located at the final moulding station and including a reciprocable plunger arranged coaxially above the lower mould member at the final moulding station, said plunger being disposed in its upper inoperative position during successive movements of the carrier and means for actuating said plunger substantially in unison with said lower member of the final mould whereby as the latter moves upwardly to engage the lower end portion of the operative ring mould, the said plunger is moved downwardly whereby its lower end enters and seats within the said ring mould.

5. A plastic moulding machine according to claim 3 including means supporting said reciprocable transfer means for angular movements about a substantially vertical axis and wherein said lower members of the preliminary and final moulds lie substantially on a common arc struck from said axis of the transfer means.

6. A plastic moulding machine according to claim 3 including powder measuring and feeding means for supplying measured charges of moulding powder to the lower member of the preliminary mould and comprising an angularly reciprocable horizontal feed plate formed with a vertical measuring compartment, a fixed table extending horizontally from the surface of the lower member of the preliminary mould and normally closing the lower end of said measuring compartment, powder supply means arranged to communicate with the upper end of the measuring compartment when the feed plate occupies its normal retracted position, and means rigidly connecting said transfer means for the preliminary mouldings to said feed plate.

7. A plastic moulding machine according to claim 1 wherein said upper plunger and lower mould member at the final moulding station and said upper plunger of the preliminary mould are operated hydraulically and including common valve means operable in timed relation with the carrier to cause said mould members to be projected and retracted substantially in unison.

8. A plastic moulding machine comprising a mould carrier supported for angular movements about a vertical axis, a plurality of spaced vertically disposed alternative ring moulds on said carrier, said ring moulds being so formed that the moulded articles are retained thereto, means operable to actuate said carrier intermittently to move said ring moulds successively to and to arrest same at spaced moulding and take-out stations, a vertically movable lower female mould member at the moulding station, a vertically movable upper plunger at the moulding station, an upper vertically movable holding member at the take-out station, a lower vertically movable holding member at said take-out station, said upper holding member being capable of passing downwardly through a ring mould disposed coaxially therebelow and means operable after each movement of the carrier to project and subsequently to retract said upper and lower mould members and said upper and lower holding members in unison, whereby during such projecting movements, the plunger of the mould enters the upper end of the ring mould in register therewith and the lower female mould member engages the lower end of said ring mould to effect the moulding of an article while the said holding members engage the upper and lower faces of the moulding supported by the ring mould at the take-out station, the said lower holding member being depressible by the upper holding member whereby the moulded article is separated thereby from the associated ring mould.

9. A plastic moulding machine according to claim 8 including means operable to rotate said holding members during the downward movements thereof.

10. A plastic moulding machine according to claim 8 including a preliminary mould spaced from said moulding station, said preliminary mould comprising a fixed lower female mould member and a vertically reciprocable pressing plunger arranged thereabove, the upper surface of said lower mould member at the said moulding station being substantially in the same horizontal plane as the upper surface of the fixed lower member of the preliminary mould when the former occupies its normal retracted position, a fixed horizontal table extending from said upper surface of the lower member of the preliminary mould, a feed member extending above said table and supported for angular movements about a vertical axis spaced from the axis of said carrier, means operable during each angular movement of the carrier to impart a forward and then a return angular movement to said feed member, said feed member having a vertical powder measuring compartment extending completely therethrough and so arranged as to register with the cavity in the lower member of the preliminary mould when said feed member is moved forwardly from its normal retracted position, the lower end of said compartment being normally closed by the surface of the table, a powder supply passage arranged to communicate with the upper end of the compartment when the feed member occupies its normal retracted position and transfer means connected to said feed member and arranged to transfer a preliminary moulding from the preliminary mould to the final mould by sliding same over the table as said feed member moves forwardly to supply a measured quantity of moulding powder to said preliminary mould.

11. A plastic moulding machine comprising an angularly movable mould carrier adapted to support a plurality of alternative members of a final mould, means operable to actuate said carrier intermittently to move said mould members successively to a final moulding station, means at said moulding station for supporting a lower mould member to coact successively with said alternative mould members, said lower mould member have a charge receiving cavity in its upper face, means operable to actuate said lower mould member whereby same is operatively engaged with the lower ends of the alternative mould members successively located at the moulding station, a preliminary mould spaced from said final moulding station, and comprising a fixed lower member and a movable upper member, means operable to actuate said upper member in timed relation with the carrier, to open and close the preliminary mould, a substantially horizontal table flush with the top of said fixed lower member of the preliminary mould and extending therefrom to adjacent said final moulding station, a transfer means arranged above and close to the surface of the table, means operable in timed relation with the carrier to eject each preliminary moulding from said lower member of the preliminary mould, and means operable in timed relation with said carrier to move said transfer means substantially horizontally thereby to slide the thus ejected preliminary mouldings successively over the table into said charge receiving cavity in said lower mould member at the final moulding station.

NATHAN FIENBERG.
ALAN REGINALD CALDER.

REFERENCES CITED

The following references are of record in the file of this patent:

UNITED STATES PATENTS

| Number | Name | Date |
|---|---|---|
| 375,628 | Hebbard | Dec. 27, 1887 |
| 1,023,433 | Lorenz et al. | Apr. 16, 1912 |
| 1,519,455 | Jacomini et al. | Dec. 16, 1924 |
| 1,614,601 | Davis | Jan. 18, 1927 |
| 1,959,612 | Burke | May 22, 1934 |
| 2,253,699 | Goss | Aug. 26, 1941 |
| 2,287,675 | Fair et al. | June 23, 1942 |